(12) United States Patent
Takahashi et al.

(10) Patent No.: US 10,103,361 B2
(45) Date of Patent: Oct. 16, 2018

(54) COIN TYPE BATTERY

(71) Applicant: Panasonic Intellectual Property Management Co., Ltd., Osaka (JP)

(72) Inventors: Tadayoshi Takahashi, Osaka (JP); Tomohiro Yagishita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/540,258

(22) PCT Filed: Dec. 19, 2016

(86) PCT No.: PCT/JP2016/005179
§ 371 (c)(1),
(2) Date: Jun. 28, 2017

(87) PCT Pub. No.: WO2017/122252
PCT Pub. Date: Jul. 20, 2017

(65) Prior Publication Data
US 2018/0138467 A1    May 17, 2018

(30) Foreign Application Priority Data

Jan. 12, 2016   (JP) .................................. 2016-003583
Mar. 11, 2016   (JP) .................................. 2016-047707

(51) Int. Cl.
*H01M 2/02*     (2006.01)
*H01M 2/04*     (2006.01)
(Continued)

(52) U.S. Cl.
CPC ....... *H01M 2/0287* (2013.01); *H01M 2/0222* (2013.01); *H01M 2/04* (2013.01);
(Continued)

(58) Field of Classification Search
CPC .... H01M 2/0287; H01M 2/0222; H01M 2/04; H01M 2/08; H01M 6/62; H01M 10/0427; H01M 10/0525
See application file for complete search history.

(56) References Cited

U.S. PATENT DOCUMENTS 6,083,644 A * 7/2000 Watanabe ............. H01M 4/131
                                                            429/218.1
6,521,373 B1 * 2/2003 Suzuki ................ H01M 2/0222
                                                            429/124

FOREIGN PATENT DOCUMENTS

JP      4-312762      11/1992

OTHER PUBLICATIONS

International Search Report of PCT application No. PCT/JP2016/005179 dated Mar. 21, 2017.

* cited by examiner

*Primary Examiner* — Helen Oi K Conley
(74) *Attorney, Agent, or Firm* — McDermott Will & Emery LLP

(57) ABSTRACT

A coin type battery includes a battery case, a sealing plate, and a power generation element sealed by the battery case and the sealing plate. At least one of the battery case and the sealing plate is made of a cladding material that includes: a surface layer disposed on the outer surface side; an intermediate layer disposed on the inner surface side of the surface layer; and a substrate layer disposed on the inner surface side of the intermediate layer. The surface layer is made of nickel, and the intermediate layer contains titanium.

7 Claims, 1 Drawing Sheet

(51) Int. Cl.
*H01M 2/08* (2006.01)
*H01M 6/16* (2006.01)
*H01M 10/04* (2006.01)
*H01M 10/0525* (2010.01)

(52) U.S. Cl.
CPC .............. *H01M 2/08* (2013.01); *H01M 6/162* (2013.01); *H01M 10/0427* (2013.01); *H01M 10/0525* (2013.01); *H01M 2200/00* (2013.01); *H01M 2220/30* (2013.01)

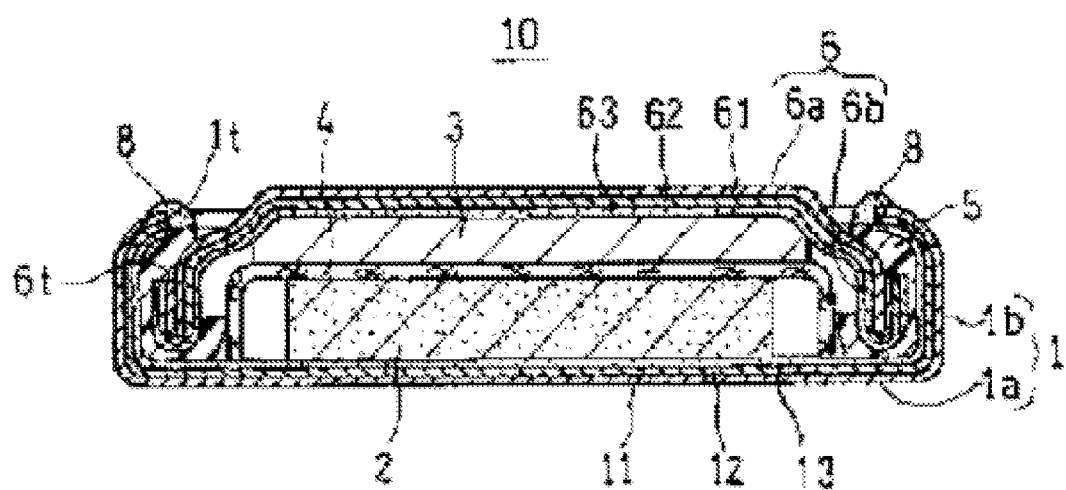

COIN TYPE BATTERY

TECHNICAL FIELD

The present invention relates to a coin type battery, and more specifically to a coin type battery having a high safety from accidental ingestion or swallow.

BACKGROUND ART

Coin type batteries are widely used as power sources for small apparatuses or memory backup. The application of the coin type batteries is continually expanded. So, countermeasures against accidental ingestion of a coin type battery become more important. When a coin type battery will be is swallowed into a living body, contacting the terminal surface of each of a case and a sealing plate of the coin type battery comes with a body fluid result in proceeding electrolysis of water. pH of body fluid is around neutral. When the electrolysis of water proceeds, the body fluid near the terminal surface on the negative electrode side shift to alkaline, and the body fluid on the positive electrode terminal side shift to acidic. Therefore, the living body is damaged.

From the viewpoint of preventing accidental ingestion, Patent Literature 1 proposes forming a conductive film containing a bitter substance on a battery surface.

CITATION LIST

Patent Literature

PTL 1: Unexamined Japanese Patent Publication No. H04-312762

SUMMARY OF THE INVENTION

However, in the case of ingesting a coin type battery in a living body without spitting out, the method of Patent Literature 1 is difficult to prevent from the above mentioned damage.

From the above-mentioned problems, the objective of the present disclosure is to provide a high safe coin type battery that can reduce the damage to a living body by accidental ingestion.

A coin type battery of the present disclosure includes the following components:

a battery case having a bottom plate and a side portion rising from a rim of the bottom plate;

a sealing plate having a top plate and a rim portion extending from the top plate to the inside of the side portion;

a gasket compressed and interposed between the side portion and the rim portion; and a power generation element sealed by the battery case and the sealing plate. At least, one of the battery case and the sealing plate is made of a cladding material that includes: a surface layer disposed on the outer surface side; an intermediate layer disposed on the inner surface side of the surface layer; and a substrate layer disposed on the inner surface side of the intermediate layer. The surface layer is made of nickel, and the intermediate layer contains titanium.

The present disclosure can reduce the damage to a living body by accidental ingestion of a coin type battery.

BRIEF DESCRIPTION OF DRAWINGS

FIG. 1 is a vertically sectional view of a coin type battery in accordance with an embodiment of the present invention.

DESCRIPTION OF EMBODIMENT(S)

A coin type battery of embodiments of the present invention includes a power generation element, and an exterior body for sealing and storing the power generation element. The exterior body includes the following components:

a bottomed battery case having an opening;

a sealing plate for blocking the opening in the battery case; and a gasket interposed between an end (opening end) of a side portion of the battery case and a rim portion of the sealing plate.

The power generation element includes: a first electrode; a second electrode; a separator interposed between them; and an electrolyte. The power generation element is filled into a space formed of the battery case and the sealing plate. Then, the opening end of the battery case is caulked to the rim portion of the sealing plate via the gasket. Thereby, the power generation element is sealed and stored in the exterior body.

The polarity of the first electrode is different from that of the second electrode. So, when the first electrode is a positive electrode (or negative electrode), the second electrode is a negative electrode (or positive electrode). When the coin type battery is a lithium battery, the positive electrode is stored so as to face the bottom plate of the battery case, and the negative electrode is stored so as to face the top plate of the sealing plate. The arrangement of the positive electrode and negative electrode is not limited to this. The coin type battery includes not only a coin-shaped battery but also a button-shaped battery. In other words, the shape and diameter of the coin type battery are not particularly limited. For example, the coin type battery in the present invention include button-shaped batteries whose thickness (the thickness of which) is greater than the diameter.

In detail, the battery case includes a bottom plate, and a side portion rising from the rim of the bottom plate. The bottom plate normally has a circular shape, but may have a shape (for example, elliptical shape) close to the circular shape. The sealing plate includes a top plate, and a rim portion extending from the top plate to the inside of the side portion of the battery case. The top plate corresponds to the shape of the bottom plate, and has a circular shape having a diameter smaller than that of the bottom plate. Thickness T of the coin type battery is often normally smaller than diameter D of the bottom plate (T<D). For example, 1.2 mm≤T≤5.0 mm, and 9 mm≤D≤24.5 mm are established. The gasket is compressed and interposed between the side portion of the battery case and the rim portion of the sealing plate. In this, at least one of the battery case and the sealing plate is made of a cladding material that includes: a surface layer disposed on the outer surface side; an intermediate layer disposed on the inner surface side of the surface layer; and a substrate layer disposed on the inner surface side of the intermediate layer. The surface layer is made of nickel, and the intermediate layer contains titanium.

In case of accidental ingestion of the coin type battery, the titanium contained in the intermediate layer has a function of suppressing the water electrolysis reaction by a contact of a body fluid with the battery case of a positive electrode and/or the sealing plate of a negative electrode.

Ususally, the exterior body of a coin type battery is made of stainless steel having a nickel-plated layer on its outer surface. In case of accidental ingestion of the coin type battery having this exterior body, the electrolysis reaction of water progresses in the body. In other words, hydrogen is generated by the electrolysis of water on the negative electrode side. Then the body fluid around the negative electrode shifts to an alkaline.

The nickel on the outer surface easily dissolves under an alkaline environment, and thereby the continuous electrolysis reaction of water continues on the exposed stainless steel surface result in that the body fluid further shifts to a strong alkaline side. While, on the positive electrode side, the electrolysis of water generates oxygen, and thereby the body fluid around the positive electrode shifts to an acid. The nickel on the outer surface easily dissolves under an acid environment, thereby the dissolution of the exposed stainless steel by corrosion reaction result in that the body fluid further shifts to a strong acid side.

The sealing plate of the present invention includes a surface layer made of nickel on its outer surface side, and an intermediate layer containing titanium on the inner surface side of the surface layer. Nickel easily dissolves under an alkaline or acid environment. Therefore, when the coin type battery is accidentally ingested, the nickel, on the outer surfaces of the battery case electrically connected to the positive electrode and/or the sealing plate electrically connected to the negative electrode, immediately dissolves. Then, the intermediate layer on the inner surface side of the outer surface is exposed to the outside.

Titanium does not cause a corrosion reaction even under a strong alkaline or strong acid environment. Therefore, around the negative electrode on the surface of the intermediate layer exposed to the outside the body fluid can be prevented from shifting to the strong alkaline side, and around the positive electrode thereon the body fluid can be prevented from shifting to the strong acid side. Therefore, the damage to the living body can be suppressed.

The intermediate layer may contain not only pure titanium (simple substance) but also a titanium alloy. The titanium alloy may contain a metal other than titanium by 7 mass % or less, for example. As the metal other, Al, Fe, or V is employed.

Titanium produces the above-mentioned effect in accidental ingestion, and has a slightly high contact resistance owing to an extremely thin and dense oxide layer existence on the surface of titanium. Furthermore, as the oxide layer gradually becomes thick in case of a long time storage at the atmosphere, the contact resistance extremely increases.

In the present invention, disposing the surface layer made of nickel on the outer surface side can reduce the contact resistance on the outer surface side. In case of a long time storage at the atmosphere, this surface layer disposed by cladding will suppress the increase of the thickness of the oxide layer on the titanium surface, compared with by plating. So the increase in the electric resistance of a material can be suppressed.

Furthermore, in case of cladding at a reduction atmosphere, a part of the oxide layer existing on the surface of the intermediate layer is decreased by the reduction, so that the electric resistance of the material can be decreased.

In the present invention, the surface layer and intermediate layer are cladded together with the substrate layer additionally. Titanium is harder and has a lower workability compared with the stainless steel or steel plate material conventionally used as an exterior body. As titanium is harder than the stainless steel or steel plate material conventionally used as an exterior body, it has a lower workability. Hence it is difficult to be used as a simple substance. Especially, using titanium for complicated shape of the battery case or sealing plate is too difficult. Therefore, decreasing the thickness of the intermediate layer, and mounting the intermediate layer on the substrate layer made of the stainless steel or steel plate material, and cladding them result in obtaining a material having workability and strength.

The thickness of the intermediate layer is preferably 3 to 50 μm more preferably 10 to 50 μm or 10 to 35 μm. The thickness of the nickel of the surface layer is preferably 0.5 to 10 μm, more preferably 1 to 3 μm.

The thickness of the substrate layer is preferably 100 to 300 μm, more preferably 180 to 250 μm. Thus, the strength enough for the exterior body is easily secured. Thus, the exterior body has easily the strength enough. At this time, in order to avoid the excessive increase in the percentage of the intermediate layer in the battery case or sealing plate, the thickness ratio (thickness of substrate layer/thickness of intermediate layer) is preferably 2 to 30, more preferably 3 to 24. When the thickness ratio is greater than 30 and the thickness percentage of the intermediate layer is excessively low, a crack can occur in the intermediate layer during the pressing of the battery case or sealing plate or during the caulking and sealing of the battery, and hence there is a risk of partially exposing the substrate layer. While, when the thickness ratio is smaller than 2 and the thickness percentage of the intermediate layer is excessively high, the battery case or sealing plate becomes excessively hard and the workability decreases. The dimension adjustment during the caulking and sealing of the battery becomes difficult, and the sealability decreases. Furthermore, the electric resistance value increases, and hence the discharge characteristic of the battery is reduced in an application requiring an output characteristic.

The substrate layer is a main material forming a frame of the exterior body. In order to obtain a frame of a high strength, it is preferable to employ at least one selected from a group consisting of stainless steel, ordinary steel, and carbon steel. The ordinary steel is steel such as an SS material, an SM material, and an SPCC material defined by Japanese Industrial Standards (JIS). The carbon steel is steel such as S10C, S20C, S30C, S45C, and S55C, and belongs to a mechanical structural alloy steel. When the ordinary steel or carbon steel is employed for the substrate layer, however, it is desirable that a nickel-plated layer for corrosion prevention is formed on the inside of the battery.

In order to keep the corrosion resistance to a power generation element and suppress the increase in the internal resistance, it is more preferable to employ stainless steel. Types of the stainless steel include: 400-series ferritic stainless steel such as SUS430, SUS444, or SUS447; 300-series austenitic stainless steel such as SUS304, SUS305, or SUS316; and two-phase stainless steel such as SUS329. A nickel alloy such as NAS254 or NAS354 having a composition similar to that of the stainless steel may be employed. Especially, 400-series ferritic stainless steel such as SUS430, SUS444, or SUS447 is particularly preferable. These materials are magnetic substances. When the coin type battery is accidentally ingested, it can be taken out of the living body using a magnet.

Hereinafter, coin type battery 10 of the exemplary embodiment of the present invention is described with reference to the accompanying drawing. However, the exemplary embodiment does not limit the technological scope of the present invention.

Power generation elements are stored in the exterior body. The power generation elements include positive electrode 2, negative electrode 3, separator 4, and an electrolytic solution (not shown). In the shown example, positive electrode 2 is disposed so as to a face bottom plate 1a of battery case 1.

Battery case 1 serves as a positive electrode terminal. While, negative electrode 3 is disposed so as to face top plate 6a of sealing plate 6. Sealing plate 6 serves as a negative electrode terminal.

In the shown example, as the material of sealing plate 6, a cladding material including surface layer 61, intermediate layer 62, and substrate layer 63 is employed. Surface layer 61 made of nickel is disposed on the outer surface of sealing plate 6, and the contact resistance between the negative electrode terminal of a used apparatus and the coin type battery decreases. When the coin type battery is accidentally ingested to a living body, nickel of surface layer 61 immediately dissolves due to a reaction with the body fluid in the living body, and the titanium in intermediate layer 62 is exposed to the outside.

As Titanium has no corrosion reaction and an extremely high hydrogenation voltage, suppressing a hydrogen generating reaction by the electrolysis of water result in reducing a shift to a strong alkaline side. Therefore the damage to the living body can be reduced.

Preferably, as substrate layer 63, stainless steel (for example, SUS430, SUS444, SUS304, or SUS329J) is employed. Instead of the stainless steel in the inner surface layer, however, a metal plate such as inexpensive ordinary steel or carbon steel may be employed.

As the material of battery case 1, a cladding material including surface layer 11, intermediate layer 12, and substrate layer 13 is employed. Surface layer 11 made of nickel is disposed on the outer surface of battery case 1, and the contact resistance between the positive electrode terminal of a used apparatus decreases and the coin type battery. In accidental ingestion of the coin type battery to a living body, the nickel of surface layer 11 immediately dissolves due to a reaction with the body fluid in the living body, and the titanium in intermediate layer 12 is exposed to the outside. Titanium does not cause a corrosion reaction, a shift to a strong acid side is reduced, and the harm to the living body can be reduced. As titanium have no corrosion reaction, a shift to a strong acid side is reduced. Therefore the damage to the living body can be reduced.

Preferably, as substrate layer 13, stainless steel (for example, SUS430, SUS444, SUS304, or SUS329J) is employed.

Next, taking a lithium battery as an example, a manufacturing method of a coin type battery is described. The manufacturing method of coin type battery 10 includes the following processes:

(a) preparing power generation elements;
(b) preparing battery case 1;
(c) preparing sealing plate 6;
(d) preparing gasket 5;
(e) storing the power generation elements in battery case 1, blocking the opening in battery case 1 with sealing plate 6, and caulking the opening end of battery case 1 to a rim portion of sealing plate 6 via gasket 5; and
(f) covering end it of side portion 1b of battery case 1 with insulating film 8. The thickness of the material (for example, the above-mentioned three-layer cladding material) used for battery case 1 and/or sealing plate 6 is 0.1 to 0.4 mm inclusive, for example.

In process (b), battery case 1 is produced by drawing a cladding material into a bottomed cylindrical shape, for example. Here, the drawing is performed so that nickel is disposed on the surface corresponding to the outer surface side of the battery.

In process (c), a sealing plate having a predetermined shape is formed by pressing a cladding material, for example. Here, the pressing is performed so that nickel is disposed on the surface corresponding to the outer surface side of the battery.

In process (d), gasket 5 is prepared which has an annular groove engaging with the rim portion of sealing plate 6. Gasket 5 may be previously mounted on the rim portion of sealing plate 6. As the material of gasket 5, polypropylene (PP), polyphenylene sulfide (PPS), or polyether ether ketone (PEEK) can be employed, for example.

In process (e), the power generation elements are stored in battery case 1, and sealing plate 6 is disposed so as to block the opening in battery case 1. Then, the opening end (end of side portion) of battery case 1 is folded inward. Thus, gasket 5 is compressed, and the lower end of gasket 5 tightly adheres to the bottom plate of the battery case. The upper end of gasket 5 tightly adheres to the rim portion of sealing plate 6.

In process (f), a solution or dispersion liquid in which an insulating material such as a rubber material is dissolved or dispersed is applied so as to cover end it of side portion 1b of battery case 1. The solution or dispersion liquid is then dried to form insulating film 8. Thus, the exposure of the substrate layer and intermediate layer at end it is suppressed.

Next, taking a lithium battery as an example, the power generation elements of the coin type battery are described. Positive electrode 2 is formed by pressure-forming a positive electrode material mixture into a coin shape. The positive electrode material mixture includes a positive electrode active material, a conductive auxiliary agent, and a binder. The type of the positive electrode active material is not especially limited, but may be an oxide (for example, manganese dioxide) or composite oxide that contains at least one selected from a group consisting of transition metals such as manganese, cobalt, nickel, magnesium, copper, iron, and niobium. Alternatively, a composite oxide (for example, $LiCoO_2$) may be employed which contains lithium and at least one selected from a group consisting of metals such as manganese, cobalt, nickel, magnesium, copper, iron, and niobium. Alternatively, graphite fluoride may be employed. The positive electrode active materials may be employed singly or in combination.

As the conductive auxiliary agent, carbon black such as acetylene black or ketjen black, or graphite such as artificial graphite can be employed. The conductive auxiliary agents may be employed singly or in combination.

As the binder, fluorine resin, styrene-butadiene rubber (SBR), modified acrylonitrile rubber, or ethylene-acrylic acid copolymer is employed, for example. The binders may be employed singly or in combination.

Negative electrode 3 includes a lithium metal or lithium alloy molded in a coin shape. As the lithium alloy, a Li—Al alloy, a Li—Sn alloy, a Li—Si alloy, or a Li—Pb alloy is employed. Negative electrode 3 may be formed by pressure-forming, into a coin shape, a negative electrode material mixture that contains a negative electrode active material and a binder. The type of the negative electrode active material is not especially limited. However, examples of the negative electrode active material include: a carbon material such as natural graphite, artificial graphite, or non-graphitizable carbon; and a metal oxide such as silicon oxide, lithium titanate, niobium pentoxide, or molybdenum dioxide. As the binder, the materials shown as the material available for the positive electrode can be optionally employed, for example. The negative electrode material mixture may contain a conductive auxiliary agent.

The electrolytic solution includes an nonaqueous solvent, and a solute (salt) dissolving in the nonaqueous solvent.

Preferably, the solute concentration in the electrolytic solution is 0.3 to 2.0 mol/L. As the nonaqueous solvent, cyclic carbonate, chain carbonate, chain ether, or cyclic ether can be employed. These nonaqueous solvents may be employed singly or in combination. As the solute, $LiBF_4$, $LiPF_6$, $LiCLO_4$, $LiCF_3SO_3$, $LiC_4F_9SO_3$, $LiN(CF_3SO_2)_2$, or $LiN(C_2F_5SO_2)_2$ is employed.

Separator 4 may be made of any material as long as the material can prevent a short circuit between positive electrode 2 and negative electrode 3. For example, woven fabric, nonwoven fabric, or microporous film made of polyolefin or polyester is employed.

Next, the present invention is specifically described on the basis of examples. However, the following examples do not limit the present invention. In the present examples, a coin type battery having a structure shown in FIG. 1 is produced.

EXAMPLE 1

(1) Battery Case

A three-layer cladding material is prepared which includes: a surface layer made of nickel of a thickness of 1 μm; an intermediate layer made of titanium of a thickness of 20 μm; and a substrate layer made of a stainless steel plate (SUS430) of a thickness of 180 μm. By drawing the cladding material, battery case 1 is produced in which the diameter of the bottom plate is 20 mm and the height of side portion 1b is 2.8 mm. The battery case is produced so that nickel is disposed on the outer surface side of the battery and the stainless steel is disposed on the inner surface side of the battery.

(2) Sealing Plate

A three-layer cladding material is prepared which includes: a surface layer made of nickel of a thickness of 1 μm; an intermediate layer made of titanium of a thickness of 10 μm; and a substrate layer made of a stainless steel plate (SUS430) of a thickness of 240 μm. By pressing the cladding material, sealing plate 6 is produced in which the diameter of top plate 6a is 17 mm. The sealing plate is produced so that nickel is disposed on the outer surface side of the battery and the stainless steel is disposed on the inner surface side of the battery.

(3) Power Generation Element

A positive electrode material mixture is prepared, by mixing 100 pts·mass of manganese dioxide as a positive electrode active material, 7 pts·mass of graphite as a conductive auxiliary agent, and 5 pts·mass of polytetrafluoroethylene as a binder. Positive electrode 2 is produced by molding the positive electrode material mixture into a coin shape of a diameter of 15 mm and a thickness of 2 mm. While, a negative electrode is produced by punching a metal lithium foil of a thickness of 0.6 mm into a circular shape of a diameter of 16 mm. As the electrolytic solution, an organic electrolyte solution produced by dissolving, at a concentration of 1.0 mol/L, $LiClO_4$ as a solute in an nonaqueous solvent that is obtained by mixing propylene carbonate and 1,2-dimethoxyethane at a volume ratio of 2:1.

(4) Assembling of Coin Type Battery

Gasket 5 that is made of polypropylene and is coated with a sealant made of blown asphalt and mineral oil is disposed inside side portion 1b of battery case 1, a current collector made of SUS430 is disposed on bottom plate 1a, and positive electrode 2 is disposed on the current collector. Next, polypropylene-made nonwoven fabric of a thickness of 300 μm is disposed as separator 4 on positive electrode 2. Then, the organic electrolyte solution is injected into battery case 1. Negative electrode 3 is pasted on the inside of top plate 6a of sealing plate 6. Next, sealing plate 6 is disposed so as to block the opening in battery case 1, and the end of side portion 1b of battery case 1 is caulked to rim portion 6b of sealing plate 6 via gasket 5. Next, styrene-butadiene rubber dissolved in toluene is applied so as to cover end 1t of side portion 1b of battery case 1, and is dried to form insulating film 8.

Thus, coin type battery A1 having a diameter of 20 mm, a thickness of 3.2 mm, and a capacitance of 225 mAh is completed.

COMPARATIVE EXAMPLE 1

Cladding material is not used as the material of the battery case and sealing plate. As the material of the battery case, a stainless steel plate (SUS430) of a thickness of 200 μm is used where a nickel-plated layer of a thickness of 1 μm is disposed on the outer surface side of the battery case. As the material of the sealing plate, a stainless steel plate (SUS430) of a thickness of 250 μm is used where a nickel-plated layer of a thickness of 1 μm is disposed on the outer surface side of the sealing plate. In the same manner as in example 1 except for this condition, coin type battery B1 is completed.

EXAMPLE 2

The same cladding material as in example 1 is used as the material of the sealing plate, and a stainless steel plate having a nickel-plated layer of a thickness of 1 μm on its outer surface side is employed as the material of the battery case as in comparative example 1. In the same manner as in example 1 except for this condition, coin type battery A2 is completed.

EXAMPLE 3

The same cladding material as in example 1 is used as the material of the battery case, and a stainless steel plate having a nickel-plated layer of a thickness of 1 μm on its outer surface side is employed as the material of the sealing plate as in comparative example 1. In the same manner as in example 1 except for this condition, coin type battery A3 is completed.

Evaluation

In each of examples 1 to 3 and comparative example 1, 10 coin type batteries are prepared. Processed meat (ham) made of pork is placed on the bottom of a petri dish of a depth of 15 mm. Then, instead of the body fluid, normal saline is poured into the petri dish to completely clip the ham into the normal saline. Then, a battery to be evaluated is mounted on the ham so that the sealing plate comes into contact with the ham. At this time, the bottom surface of the battery case is set slightly lower than the liquid level of the normal saline so that the battery does not float, thereby creating the state in which a film of the saline is produced on the case bottom surface. This state is kept at 25° C. for 30 minutes. Then, when the state of the ham contacted with the sealing plate is observed visually, discoloration is hardly observed in the ham on which the battery in each of examples 1 to 3 is mounted. While, a strong discoloration is observed in the ham on which the battery in comparative example 1 is mounted. Ten batteries in each example show the same trend.

Next, the pH of the surface of the ham having been in contact with the sealing plate or battery case is measured, and the average value of 10 values is calculated. The result is shown in Table 1.

TABLE 1

|  | A1 | A2 | A3 | B1 |
|---|---|---|---|---|
| Battery case | Ni/Ti/SUS | Ni/SUS | Ni/Ti/SUS | Ni/SUS |
| Sealing plate | Ni/Ti/SUS | Ni/Ti/SUS | Ni/SUS | Ni/SUS |
| Discoloration | Almost no | Almost no | Almost no | Strong |
| pH | 6.6 | 6.7 | 6.7 | >14 |

Thus, as the exterior body, a three-layer cladding material made of nickel, titanium, and stainless steel is employed. Even if accidental ingestion of a coin type battery occurs, it is clear that the harm damage to the living body can be significantly reduced.

In the above-mentioned examples, the intermediate layer is made of a pure metal of titanium. Even though the intermediate layer is made of a titanium alloy, it is considered that the safety of the coin type battery can be improved similarly.

The present invention can be applied to various batteries—such as a lithium battery, an alkaline battery, and an alkaline storage battery—including a primary battery and secondary battery. The present invention is especially useful for a battery (for example, lithium battery) having a battery voltage higher than 3.0 V.

The invention claimed is:

1. A coin type battery comprising:
   a battery case having a bottom plate and a side portion rising from a rim of the bottom plate;
   a sealing plate having a top plate and a rim portion extending from the top plate to an inside of the side portion;
   a gasket compressed and interposed between the side portion and the rim portion; and
   a power generation element sealed by the battery case and the sealing plate,
   wherein
      at least one of the battery case and the sealing plate is made of a cladding material, the cladding material including:
         a surface layer disposed on an outer surface side;
         an intermediate layer disposed on an inner surface side of the surface layer; and
         a substrate layer disposed on an inner surface side of the intermediate layer, and
         the surface layer is made of nickel, and the intermediate layer contains titanium.

2. The coin type battery according to claim 1, wherein the substrate layer is made of stainless steel.

3. The coin type battery according to claim 2, wherein the stainless steel used for the substrate layer includes a magnetic substance.

4. The coin type battery according to claim 1, wherein at least the sealing plate includes the surface layer, the intermediate layer, and the substrate layer.

5. The coin type battery according to claim 1, wherein at least the battery case includes the surface layer, the intermediate layer, and the substrate layer.

6. The coin type battery according to claim 1, wherein a thickness of the intermediate layer is 3 to 50 μm inclusive.

7. The coin type battery according to claim 1, wherein a thickness of the intermediate layer is 10 to 50 μm inclusive.

* * * * *